United States Patent [19]

Yamamori et al.

[11] Patent Number: 4,835,231

[45] Date of Patent: May 30, 1989

[54] DISINTEGRATION TYPE, CROSSLINKED ACRYLIC RESIN PARTICLES

[75] Inventors: Naoki Yamamori; Kazunori Kanda, both of Osaka, Japan

[73] Assignee: Nippon Paint Co., Ltd., Osaka, Japan

[21] Appl. No.: 89,562

[22] Filed: Aug. 26, 1987

[30] Foreign Application Priority Data

Aug. 26, 1986 [JP] Japan .............................. 61-200344

[51] Int. Cl.$^4$ .............................................. C08F 30/04
[52] U.S. Cl. .................................... 526/240; 526/241
[58] Field of Search ............................... 526/240, 241

[56] References Cited

U.S. PATENT DOCUMENTS

| | | | |
|---|---|---|---|
| 2,930,768 | 3/1960 | Hopkins | 526/240 |
| 4,021,392 | 5/1977 | Milne et al. | 523/177 |
| 4,482,701 | 11/1984 | Yamamori et al. | 524/603 |

FOREIGN PATENT DOCUMENTS

| | | | |
|---|---|---|---|
| 1156000 | 10/1983 | Canada | 526/240 |
| 3338431 | 5/1985 | Fed. Rep. of Germany | 526/240 |
| 45-9950 | 4/1970 | Japan | 526/240 |
| 49-38109 | 10/1974 | Japan | 526/240 |
| 59-142263 | 8/1984 | Japan | 526/240 |
| 59-221301 | 12/1984 | Japan | 526/240 |
| 7309239 | 1/1974 | Netherlands | 526/240 |
| 839825 | 6/1960 | United Kingdom | 526/240 |
| 1378212 | 12/1974 | United Kingdom | 526/240 |
| 2096624 | 10/1982 | United Kingdom | 526/240 |
| 8001164 | 6/1980 | World Int. Prop. O. | 526/240 |

*Primary Examiner*—Joseph L. Schofer
*Assistant Examiner*—N. Sarofin
*Attorney, Agent, or Firm*—Wenderoth, Lind & Ponack

[57] ABSTRACT

Disintegration type, crosslinked acrylic resin particles having an average grain diameter of 0.01 to 250 $\mu$ and containing metal ester bond bearing crosslinks uniformly distributed within the particle bodies are provided in spherical form by the polymerization of 5 to 98% by weight of at least one metal ester bond bearing multifunctional polymerizable monomer and 95 to 2% by weight of at least one other polymerizable monomer. The instant resin particles are specifically useful as resinous filler in an antifouling paint and other compositions.

8 Claims, 1 Drawing Sheet

DISINTEGRATION TYPE, CROSSLINKED ACRYLIC RESIN PARTICLES

FIELD OF INVENTION

The present invention relates to disintegration type, crosslinked acrylic resin particles and more specifically spherical form of internally crosslinked acrylic resin particles which can be thoroughly disintegrated from the interior and exterior of the respective grain in an ionic atmosphere, and are useful as resinous filler for various compositions and especially in an antifouling paint.

BACKGROUND OF THE INVENTION

Recently, in an antifouling paint and other areas, public attentions are directed to the use of resinous filler particles which can be hydrolyzed in an ionic atmosphere as in sea water of weak alkaline condition and gradually decomposed and dissolved out. They are specifically useful for prolonging antifouling and polishing effects of an antifouling paint and attaining energy saving and others therewith.

Various resins have been proposed for this end as, for example, acrylic resins with halogenated aliphatic acid bonding units or electron attractive group containing acyl bondings (e.g. Japanese Patent Appln. No. 101463/81 and ibid 198240/81); acrylic resins containing organic tin salts (e.g. Japanese Patent Appln. Kokai No. 98570/82); and polyester resins having metal ester bondings in the polymer main chain (e.g. Japanese Patent Appln. No. 165921/81 and ibid 165922/81) and the like.

However, they were merely developed as resinous vehicles for antifouling paints, requiring film-forming properties and optimum film performance and therefore, there were in fact various limitations on the employable resins in respect of molecular weight, metal contents and the like, besides the hydrolysis natures thereof.

In a coating composition area, attempts have also been made to add, to a film-forming resinous varnish, resin powders for the improvement in application characteristics, without increasing viscosity, of the coating composition. Therefore, even in an antifouling paint, hydrolysis type resin powders having no film-forming properties have been actually examined. For example, in Japanese Patent Publication No. 3830/86, are disclosed film-forming polymer compositions comprising a polyacrylic acid salt having a basic unit of the formula:

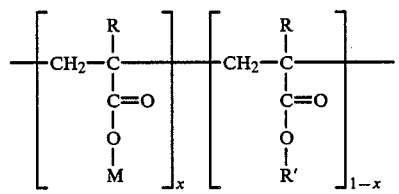

in which M stands for Cu or Zn.

It is stated that said polyacrylic acid salts may be of film-forming type or of non-film-forming type and the molecular weight is in a range of 5000 to $1 \times 10^6$. Therefore, it is clear that hydrolysis type crosslinked resins having no film-forming properties are likewise suggested in this publication. However, in preparing said resins, a specific method is used, wherein a carboxyl bearing acrylic resin is first neutralized with caustic soda and dissolved in an aqueous medium and thus obtained polymer solution is reacted with a metal salt, thereby forming precipitation of insoluble polyacrylic acid salt. In this type of reaction, the soluble resin is gradually changed to insoluble type with the progress of ion-exchange reaction, and the formed insoluble resins are precipitated as amorphous masses each varying in size and shape. Since a smaller precipitate has a larger surface area and more rapidly hydrolyzed with sea water than a larger one, when the aforesaid precipitates are used in a self-polishing type antifouling paint, smaller precipitates are quickly hydrolyzed and consumed and larger precipitates are wastefully let out the coating with the dissolved resin. Therefore, indeed an effective antifouling can be expected with the composition in an early stage, but a long-lasting effect cannot be obtained therewith. Furthermore, in the method of said Japanese Patent Publication No. 830/86, an acrylic resin and a metal salt are reacted with each other each in solution form in water, and loss in solubility of the resin is the only cause of said precipitation. Since the reaction makes steady progress at the surface of precipitated resin interacted with aqueous metal salt solution, the metal ester bondings are always present in a higher concentration at the surface layers of the precipitates. Moreover, the precipitated resins do necessarily have a number of acid groups together with metal ester bondings, because precipitation is occurred in an aqueous medium by the decrease in solubility of the resin. They are, therefore, too hygroscopic to use as the resinous filler in a polishing type antifouling paint. For these reasons, a long-lasting antifouling effect cannot be expected with the coating composition added with the disclosed precipitates.

Since the precipitates are not of spherical form, they can never be maintained in a stabilized state of dispersion in a coating composition.

It is, therefore, an object of the invention to provide disintegration type, crosslinked acrylic resin particles which can be added as resinous filler in an antifouling paint, and thoroughly disintegrated from the interior and exterior of the respective grain, in an ionic atmosphere. An additional object of the invention is to provide the acrylic resin particles with the aforesaid characteristic properties, prepared by a method which is simple but still effective for the control of water susceptibility and hydrolysis rate of the formed resin particles.

Further object of the invention is to provide disintegration type, spherical, internally crosslinked acrylic resin particles which are particularly useful in a polishing type antifouling paint. Other objects of the invention shall be clear from the description of the specification and accompanied claims.

SUMMARY OF THE INVENTION

According to the invention, the aforesaid objects can be attained with the present disintegration type crosslinked acrylic resin particles having an average grain diameter of 0.01 to 250μ and containing metal ester bond bearing crosslinks uniformly distributed within the particle bodies prepared by the method wherein a monomer mixture of (A) 5 to 98% by weight of metal ester bond bearing multifunctional polymerizable monomer represented by the formula:

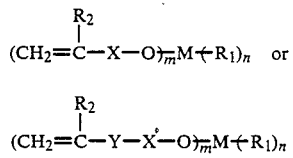

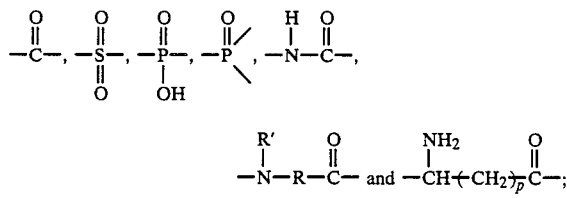

(in which $R_2$ represents hydrogen or methyl group; X is

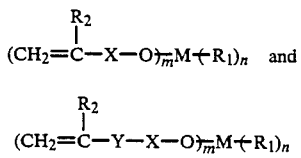

$R'$ is hydrogen, methyl or ethyl group ; R is a hydrocarbon residue having 1 to 20 carbon atoms ; p is 0 or 1 to 5 ; $R_1$ is hydrocarbon residue having 1 to 10 carbon atoms; M is a metal whose valency is 2 or more; Y is an organic residue; m and n are positive integers satisfying the conditions: $2 \leq m \leq q$, $n = q - m$ wherein q is equal to the metal valency) and 95 to 2% by weight of mono- or multi-functional polymerizable monomer other than said (A) having at least one $\alpha,\beta$-ethylenically unsaturation bond, in a reaction medium which is unable to dissolve the formed polymer.

DESCRIPTION OF THE PREFERRED EMBODIMENTS

Figure 1:
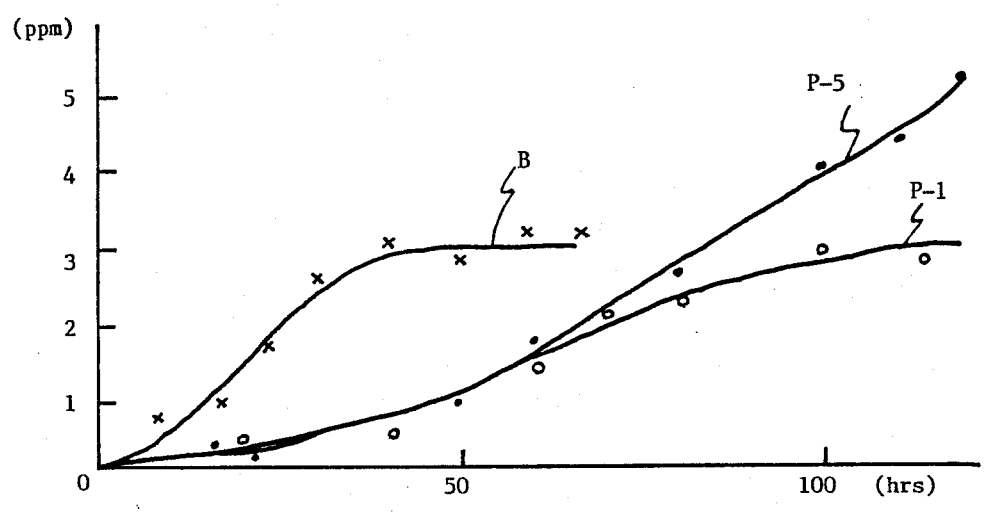
FIG. 1 shows the curves each showing the correlation between the metal ion concentration in aqueous KOH solution (pH=10.3) dissolved out of the acrylic resin particles by hydrolysis and hydrolysis time. P-1 and P-5 are of the present crosslinked acrylic resin particles and B stands for the resin particles of Comparative Example 2.

The metal ester bond bearing multifunctional polymerizable monomers used in the preparation of the present resin particles are the compounds represented by either one of the following formulae:

$$(CH_2=\overset{R_2}{\underset{|}{C}}-X-O)_{\overline{m}}M(R_1)_n \text{ and}$$

$$(CH_2=\overset{R_2}{\underset{|}{C}}-Y-X-O)_{\overline{m}}M(R_1)_n$$

(wherein $R_2$, $R_1$, X, Y, M, m and n each have the same meaning as defined above)

which are characterized by having at least 2 $\alpha,\beta$-ethylenically unsaturated bondings and containing metal ester bonding in the molecule. Said compounds are crosslinking monomers and are used each singularly or in the combination of two or more.

The aforesaid monomers may be easily and advantageously prepared by reacting, under stirring, (a) a metal salt as metal oxide, metal hydroxide, metal sulfide and metal chloride, and (b) a polymerizable unsaturated organic acid represented by the formula:

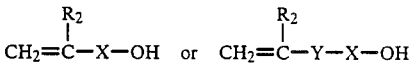

or alkali metal salt thereof, preferably in a solvent, at an elevated temperature which is lower than the decomposition temperature of said metal salt. Examples of said polymerizable unsaturated organic acids are methacrylic acid, acrylic acid, p-styrene sulfonic acid, 2-methyl-2-acrylamide propane sulfonic acid, 3-acid phosphoxy propyl methacrylate, 3-chloro-2-acid phosphoxy propyl methacrylate, 2-acid phosphoxy ethyl methacrylate, itaconic acid, itaconic anhydride, maleic acid, maleic anhydride, monoalkyl itaconate (e.g. methyl-, ethyl-, butyl-, 2-ethylhexyl-itaconates and the like), monoalkyl maleate (e.g. methyl-, ethyl-, butyl-, 2-ethylhexyl-maleates and the like), half-esters of acid anhydrides with hydroxyl containing polymerizable unsaturated monomers, for example, half-ester of acid anhydride as succinic anhydride, maleic anhydride, phthalic anhydride and the like, with 2-hydroxyethyl (meth) acrylate and the like. These organic acids are used each singularly or in the combination form of two or more.

As the metal component, any of the metals whose valences are 2 or more may be satisfactorily used.

Such metals include the members that belong to the groups Ib, IIa, IIb, IIIa, IIIb, IVa, IVb, Va, Vb, VIIa and VIII of the Periodic Table. Preferably, said metal is selected from the group consisting of Cu, Zn, Ni, Co, Mn, Sn, Hg, Ti, Ge, Ga, Al and Mg.

Since the present resinous particles are, as minutely stated hereinunder, hydrolyzed at the metal ester bondings, in an ionic atmosphere and disintegrated into small resin segments bearing acid groups and metal ions, one may use the same as toxic substance source and resinous filler in an antifouling paint by selecting such toxic metals as Cu, Zn, Ni, Co, Mn, Sn, Hg and others which are toxic towards submarine living organisms. It is also possible to use the present resinous particles for soil conditioning and other purposes than the antifouling paints by the selective use of particular metals which are optimum for the intended objects as, for example, Ti, Ge, Ga, Al, Mg, Y, Sr, Zr, Bi, Ba, Ca, Fe and the like. In this invention, the abovesaid metal ester bond bearing multifunctional polymerizable monomers are used in an amount corresponding to 5 to 98% by weight of the total monomers. This is because if the abovesaid multifunctional monomers are less than 5% by weight of the total monomers used, the produced resin is dissolved in a polar solvent and thus cannot be maintained in the form of resinous particles in that solvent.

The other monomers used in an amount of 95 to 2% by weight with the abovesaid metal ester bond bearing multifunctional monomers are selected from monofunctional and multifunctional $\alpha,\beta$-ethylenically unsaturated monomers, which may be classified as follows:

(1) carboxyl containing monomers, as, for example, acrylic acid, methacrylic acid, crotonic acid, itaconic acid, maleic acid, fumaric acid and the like, (2) hydroxyl containing monomers, as, for example, 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol, methallyl alcohol and the like, (3) nitrogen containing alkyl (meth) acrylates, as, for example, dimethyl aminoethyl acrylate, dimethyl aminoethyl methacrylate and the like, (4) polymerizable amides, as, for example, acrylamide, methacrylamide and the like, (5) polymerizable nitriles, as, for example, acrylonitrile, methacrylonitrile and the like, (6) alkyl acrylates and alkyl methacrylates, as, for example, methyl acrylate, methyl methacrylate, ethyl acrylate, ethyl methacrylate, n-butyl acrylate, n-butyl methacrylate, 2-ethyl hexyl acrylate and the like, (7) polymerizable aromatic compounds, as, for example, styrene, α-methyl styrene, vinyl toluene, t-butyl styrene and the like, (8) α-olefins, as, for example, ethylene, propylene and the like, (9) vinyl compounds, as, for example, vinyl acetate, vinyl propionate and the like,

(10) diene compounds, as, for example, butadiene, isoprene and the like,

(11) metal containing monofunctional compounds, as, for example, vinyl ferrocene, trialkyl tin (meth) acrylate, γ-methacryloyl-oxy-trimethoxy silane and the like. Multifunctional polymerizable monomer other than said metal ester bond bearing polymerizable monomer may likewise be used, providing having 2 or more radically polymerizable, ethylenic bonds per molecule.

Examples of such monomers are polymerizable unsaturated monocarboxylic acid esters of polyhydric alcohols, polymerizable unsaturated alcohol esters of polycarboxylic acids, and aromatic compounds substituted with 2 or more vinyl groups and the like, including ethylene glycol diacrylate, ethylene glycol dimethacrylate, triethylene glycol dimethacrylate, tetraethylene glycol dimethacrylate, 1,3-butylene glycol dimethacrylate, trimethylol propane triacrylate, trimethylol propane trimethacrylate, 1,4-butanediol diacrylate, neopentyl glycol diacrylate, 1,6-hexanediol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycerol dimethacrylate, glycerol diacrylate, glycerol allyloxy dimethacrylate, 1,1,1-trishydroxy methyl ethane diacrylate, 1,1,1-trishydroxy methyl ethane triacrylate, 1,1,1-trishydroxy methyl ethane dimethacrylate, 1,1,1-trishydroxy methyl ethane trimethacrylate, 1,1,1-trishydroxy methyl propane diacrylate, 1,1,1-trishydroxy methyl propane triacrylate, 1,1,1-trishydroxy methyl propane dimethacrylate, 1,1,1-trishydroxy methyl propane trimethacrylate, triallyl cyanurate, triallyl isocyanurate, triallyl trimellitate, diallyl terephthalate, diallyl phthalate, divinyl benzene and the like.

The monomer mixture of 5 to 98% by weight of at least one of the aforesaid metal ester bond bearing multifunctional polymerizable monomers and 95 to 2% by weight of at least one of the abovesaid mono- or multifunctional polymerizable monomers is polymerized according to a conventional polymerization technique, in a reaction medium which cannot dissolve the formed polymer to give the present disintegration type crosslinked acrylic resin particles having an average grain diameter of 0.01 to 250 μ. As the polymerization technique, any of the conventional emulsion polymerization, NAD polymerization, suspension polymerization, precipitation polymerization means may be satisfactorily used. The polymerization initiators used are also of conventional type. Typical examples are organic peroxides as benzoyl peroxide, t-butyl peroxide, cumene hydroperoxide and the like; organic azo compounds as azobiscyanovaleric acid, azobisisobutyronitrile, azobis(2,4-dimethyl) valeronitrile, azobis(2-amidinopropane) hydrochloride and the like; inorganic water soluble radical initiators as potassium persulfate, ammonium persulfate, hydrogen peroxide and the like; and redox type initiators comprising the abovesaid inorganic water soluble radical initiator and sodium pyrosulfite, sodium bisulfite or bivalent iron ions.

If desired, an appropriate amount of conventional chain transfer agent as, for example, lauryl mercaptan, hexyl mercaptan and the like may be used therewith. In obtaining the present acrylic resin particles having relatively fine average grain diameter, e.g. 0.01 to 40 μ, it is highly recommended to adopt an emulsion polymerization means wherein a monomer mixture is polymerized in water or aqueous medium containing water miscible organic solvent in the presence of an appropriate surfactant or resin. Water is then removed off from thus obtained emulsion by, for example, spray drying, solvent substitution, azeotropic distillation, filtration and drying, to obtain the resin particles.

The present resinous particles may also be prepared by polymerizing a mixture of the defined monomers in an organic solvent which can dissolve the monomers used but not the produced polymer as, for example, hexane, heptane, octane and other aliphatic hydrocarbons (by the so-called NAD polymerization method), or by adopting a conventional suspension polymerization or precipitation polymerization means. Pulverization and screening may be used for the control of the average grain diameter of the present resin particles.

In either method, the aforesaid metal ester bond bearing multifunctional polymerizable monomers and other copolymerizable monomers are copolymerized in a reaction medium which cannot dissolve the formed polymer, and therefore, thus obtained crosslinked acrylic resin particles of the invention are characterized by that they each have a distinct interface, and the metal ester bondings represented by the formula:

are necessarily included in the crosslinked portions of the resin molecule.

Thus, a number of the aforesaid metal ester bondings are uniformly distributed within the whole body of the resin particle.

Since the metal ester bonding is easily hydrolyzed under ionic atmosphere, the present acrylic resin particles are disintegrated under certain conditions by hydrolysis, and hence, they may be called, in that sense, as disintegration type or collapsible resin particles, in contrast to heretofore proposed hydrolyzable resin particles. Usually, the present acrylic resin particles have the crosslink density of said metal ester bond bearing crosslinks, expressed in terms of (number of moles of organic acid involved in the metal ester bond bearing crosslinks)/(gram of resin particles) of 0.00003 to 0.01 mol/g.

At the level of less than 0.00003 mol/g, no adequate and effective disintegration of the resin particles can be obtained, whereas at the level of more than 0.01 mol/g, considerable difficulties are encountered in the preparation of the resin particles.

In a most preferable embodiment of the invention, the said acrylic resin particles are prepared, each in spherical form, so that the crosslink density of metal ester bond bearing crosslinks in the center portion is much higher than those of the surface layers.

Such resin particles may be advantageously prepared by polymerizing the aforesaid monomer mixture in an appropriate reaction medium which cannot dissolve the metal ester bond bearing multifunctional polymerizable monomer as well as the formed polymer.

By the selection of other soluble monomers, the metal ester bonds are concentrated in the center portion of the particle body and the surface layers are mainly composed of said soluble monomers.

Solubility difference of the metal ester bond bearing multifunctional monomer and other polymerizable monomer in a defined reaction medium may also be utilized for the same purpose. By the selection of particular polymerizable monomer whose solubility in the reaction medium is much higher than the solubility of metal ester bond bearing multifunctional monomer, the metal ester crosslink density inclines toward the center portion of the respective resin particle.

In another method, monomer addition sequence or monomer ratio may be altered in the course of the polymerization. For example, monomer mixture with comparatively larger quantity of metal ester bond bearing multifunctional monomer or only metal ester bond bearing multifunctional monomer may be added to the reaction system in an early stage of polymerization and monomer mixture with lesser quantity of said multifunctional monomer in the later stage of the polymerization, thereby forming the double structured particle with metal ester rich core portion and metal ester poor shell portion. Location and amount of metal ester bonds in the present acrylic resin particles may be easily determined by simple analysis means. That is, metal ester bonds present in about 10 Å thickness of the acrylic resin particle may be easily determined both qualitatively and quantitatively by X-ray photoelectron spectroscopy (XPS) means. Depth profile of the included metal can be determined by adopting argon etching and XPS means in about 5 to 1000 Å thickness. X-ray fluorescence analysis method (XF method), electron probe X-ray micro analysis (EPMA), atomic absorption spectroscopy and the like may also be used in the determination of the metal content of the resin particles obtained.

Since the present crosslinked acrylic resin particles are mainly used as resinous filler in an antifouling paint or other coating compositions, the average grain diameter is limited in a range of 0.01 to 250 $\mu$, preferably from 0.01 to 70 $\mu$ and most preferably from 0.02 to 20 $\mu$. This is because, if the grain diameter is less than 0.01 $\mu$, there are difficulties in actual handling of the resin particles due to dust problem and the like. This is because, if the grain diameter is less than 0.01 $\mu$, there are problems such that considerable difficulties are involved in the actual handling of the resin particles due to dusting or the like and that long-lasting antifouling effect cannot be attained with the resin particles because of their excessively higher decomposition speed in hydrolysis due to large specific surface area. On the other hand, if the average grain diameter is more than 250 $\mu$, there are problems such that only rough surface can be resulted with the coating composition and no effective disintegration of the resin particles can be expected therewith.

This invention shall be now more fully explained in the following Examples. Unless otherwise being stated, all parts and percentages are by weight. In these examples, the indicated average grain diameter of the primary resin particles was determined by using Scanning Electron Microscope (SEM).

EXAMPLE 1

Into a four-necked flask fitted with a stirrer and a reflux condenser, were placed 700 parts of isopropyl alcohol and 300 parts of deionized water and the mixture was heated to 75° to 85° C. While maintaining the same temperature, 40 parts of zinc dimethacrylate, 60 parts of methyl methacrylate and 2 parts of azoisobutyronitrile were added to said solution and the combined mixture was stirred and reacted for 5 hours. Thereafter, the mixture was filtered and thus separated particles were dried. Acrylic resin particles (P-1) having an average grain diameter of 1.1 were obtained, whose zinc content determined by XF method (X-ray fluorescent method ) was 94000 ppm. In XPS analysis, clear peaks derived from 2p of Zn were observed at 1020 and 1044 eV. After etching the surface layer in 200 Å and 400 Å thickness with argon gas, the peak intensities were again examined by XPS and 1.2 times and 1.3 times stronger peaks were observed, respectively.

From these test results, it was concluded that the metal ester bond containing crosslinks were uniformly distributed in much higher concentration in the inside of particle body than the surface layer thereof.

EXAMPLE 2

The same procedures as stated in Example 1 were repeated, excepting substituting 40 parts of gallium trimethacrylate for 40 parts of zinc dimethacrylate. Acrylic resin particles (P-2) having an average primary grain diameter of 1.0$\mu$ were obtained.

EXAMPLE 3

The same procedures as stated in Example 1 were repeated, excepting substituting 20 parts of nickel dimethacrylate and 20 parts of iron trimethacryl ethyl phosphate for 40 parts of zinc dimethacrylate, to obtain acrylic resin particles (P-3) having an average primary grain diameter of 1.4 $\mu$.

EXAMPLE 4

The same procedures as stated in Example 1 were repeated, excepting substituting 40 parts of titanium dimethacryl ethyl phosphate for 40 parts of zinc dimethacrylate to obtain acrylic resin particles (P-4) having an average primary grain diameter of 0.8 $\mu$.

EXAMPLE 5

(1) Preparation of emulsifier having amphoionic groups:

Into a 2 liters flask fitted with a stirrer, a nitrogen gas inlet tube, a thermoregulator, a condenser and a decanter, were placed 134 parts of bishydroxy ethyl taurine, 130 parts of neopentyl glycol, 236 parts of azelaic acid, 186 parts of phthalic anhydride and 27 parts of xylene and the mixture was heated while removing the formed water azeotropically. The temperature was raised to 190° C. in about 2 hours from the commencement of reflux, both stirring and dehydration were continued until the acid value (equivalent to carboxylic acid) reached 145, and the mixture was then allowed to cool to 140° C. While maintaining the temperature at 140° C., 314 parts of glycidyl versatate (Cardura E-10, trademark of Shell Co.) were dropwise added in 30 minutes and the combined mixture was further stirred for 2 hours and the reaction was over. Thus obtained polyester resin had an acid value of 59, a hydroxyl value of 90 and a number average molecular weight of 1054, which was hereinafter referred to as emulsifier A.

(2) Preparation of acrylic resin particles Into a 2 liters reactor fitted with a stirrer, a condenser and a thermoregulator, were placed 380 parts of deionize water, 50 parts of the emulsifier A and 5 parts of dimethyl ethanol amine and the mixture was heated, under stirring, to 80° C. to get a solution. To this, were dropwise and simultaneously added with a solution of 2.5 parts of azobiscyanovaleric acid in 50 parts of deionized water and 1.6 parts of dimethyl ethanol amine, a mixed solution of 100 parts of methyl methacrylate, 40 parts of styrene and 35 parts of n-butyl acrylate and a solution of 75 parts of dibutyl tin dimethacrylate in 252 parts of deionized water in 90 minutes and thereafter, the combined mixture was further stirred for 90 minutes to obtain an aqueous dispersion of acrylic resin particles having an average primary grain diameter of 48 m $\mu$. This dispersion was then subjected to a freeze drying to obtain the acrylic resin particles (P-5), whose tin content determined by XF method was 72000 ppm. EPS analysis of thus obtained particles showed clear peaks derived from 3d and 3p of Sn at 490 eV and 715 eV, respectively. After 200 Å and 400 |etching with argon gas, EPS analysis was again conducted with the etched particles. 2.5 times and 4.2 times stronger peaks were observed.

From these test results, it is clear that metal ester bonds are highly concentrated in the inside of the respective particle as compared with the surface layer.

EXAMPLE 6

Into a 1 liter reactor fitted with a stirrer, a condenser and a thermoregulator, were placed 1000 parts of deionized water and 30 parts of polyvinyl alcohol (average molecular weight 1500) and the mixture was, while stirring at 1000 rpm and purging with nitrogen gas, heated to 60° C. To this, were dropwise and simultaneously added a mixture of 20 parts of tributyl tin methacrylate, 13 parts of methyl methacrylate, 2 parts of 2-hydroxyethyl acrylate and 1 part of 2,2'-azobis-(2,4-dimethyl valeronitrile) (polymerization initiator, V-65, trademark of Wakoh Junyaku Kogyo K.K.) and a solution of 15 parts of tetra-methacrylic titanate in 150 parts of deionized water in 1 hour. After completion of said addition, the combined mixture was heated at 70° C. and reacted for 5 hours to obtain a suspension of resinous fine particles. The suspension was then subjected to a centrifugal separation and the precipitated resinous particles were separated from the supernatant and again dispersed in deionized water. The abovesaid centrifugal separation and redispersion in deionized water operations were repeated three times to obtain acrylic resin particles (P-6) having an average primary grain diameter of 7.5 $\mu$.

EXAMPLE 7

The same procedures as stated in Example 1 were repeated, excepting substituting 40 parts of yttrium dimethacrylate for 40 parts of zinc dimethacrylate, to obtain acrylic resin particles (P-7) having an average primary grain diameter of 1.4 $\mu$.

EXAMPLE 8

The same procedures as stated in Example 1 were repeated, excepting substituting 30 parts of strontium dimethacrylate for 40 parts of zinc dimethacrylate, and 30 parts of methyl methacrylate and 30 parts of n-butyl acrylate for 60 parts of methyl methacrylate, to obtain acrylic resin particles (P-8) having an average primary grain diameter of 2.1 $\mu$.

EXAMPLE 9

The same procedures as stated in Example 1 were repeated, excepting substituting 8 parts of copper salt of 3-acid phosphoxy propyl methacrylate and 32 parts of divinyl benzene for 40 parts of zinc dimethacrylate, to obtain acrylic resin particles (P-9) having an average primary grain diameter of 5 $\mu$.

EXAMPLE 10

The same procedures as stated in Example 1 were repeated, excepting substituting 60 parts of cobalt di-2-methyl-2-acrylamide-propane sulfonate for 40 parts of zinc dimethacrylate and 40 parts of methyl methacrylate for 60 parts of methyl methacrylate, to obtain acrylic resin particles (P-10) having an average primary grain diameter of 3 $\mu$.

EXAMPLE 11

The same procedures as stated in Example 1 were repeated, excepting substituting 50 parts of dioctyl tin dimethacrylate for 40 parts of zinc dimethacrylate and 50 parts of methyl methacrylate for 60 parts of methyl methacrylate, to obtain acrylic resin particles (P-11) having an average primary grain diameter of 3 $\mu$.

EXAMPLE 12

Into a four-necked flask fitted with a reflux condenser, a stirrer and a nitrogen gas inlet tube, were placed 800 parts of n-heptane, 15 parts of tetramethacrylic titanate, 85 parts of methyl methacrylate and 3 parts of azobisisobutyronitrile and the mixture was heated, under nitrogen stream, at 75° to 80° C. and reacted for 4 hours. With the progress of polymerization, fine particles of resinous material were appeared and settled in the reaction system. After filtration, thus separated product was subjected to drying to obtain acrylic resin particles(P-12) having an average primary grain diameter of 7 $\mu$.

EXAMPLE 13

The same procedures as stated in Example 12 were repeated, excepting substituting 10 parts of tetramethacrylic titanate and 20 parts of manganese dimethacrylate, 50 parts of methyl methacrylate and 20 parts of n-butyl methacrylate for 15 parts of tetramethacrylic titanate and 85 parts of methyl methacrylate, to obtain acrylic resin particles (P-13) having an average primary grain diameter of 1.5 $\mu$.

EXAMPLE 14

The same procedures as stated in Example 12 were repeated, excepting substituting 30 parts of tetramethacrylic zirconate, 50 parts of methyl methacrylate and 20 parts of n-butyl methacrylate for 15 parts of tetramethacrylic titanate and 85 parts of methyl methacrylate, to obtain acrylic resin particles (P-14) having an average primary grain diameter of 2 $\mu$.

EXAMPLE 15

The same procedures as stated in Example 12 were repeated, excepting substituting 40 parts of gallium trimethacrylate and 60 parts of methyl methacrylate for 15 parts of tetramethacrylic titanate and 85 parts of methyl methacrylate, to obtain acrylic resin particles (P-15) having an average primary grain diameter of 1.5 μ.

EXAMPLE 16

The same procedures as stated in Example 12 were repeated, excepting substituting 35 parts of Bismuth salt of 3-acid phosphoxy propyl methacrylate and 65 parts of methyl methacrylate for 15 parts of tetramethacrylic titanate and 85 parts of methyl methacrylate, to obtain acrylic resin particles (P-16) having an average primary grain diameter of 4 μ. In each of the aforesaid Examples 1 to 16, the presence of the used metal element in the final resin particles was confirmed by a qualitative analysis of the produced resin particles using Energy Dispersion Type X-ray Analyser (EDX) fitted with Scanning Electron Microscope (SEM).

EXAMPLE 17

The same procedures as stated in Example 5 were repeated, excepting substituting 75 parts of aluminum tri-N-methacryloyl carbamate for 75 parts of dibutyl tin dimethacrylate, to obtain acrylic resin particles (P-17) having an average primary grain diameter of 60 μ.

COMPARATIVE EXAMPLE 1

The same procedures as stated in Example 1 were repeated, excepting substituting 40 parts of ethylene glycol dimethacrylate for 40 parts of zinc dimethacrylate, to obtain Comparative acrylic resin particles A.

COMPARATIVE EXAMPLE 2

To a stirred 500 ml of aqueous 20% solution of copolymer of sodium methacrylate and methyl methacrylate (37:60 parts by weight), were dropwise added 41 parts of $ZnSO_4.7H_2O$. The formed precipitates were centrifuged, washed several times with distilled water and dried in a vacuum furnace at 50° C. to obtain Comparative acrylic resin particles B, whose Zn content measured by XF method was 95000 ppm. XPS analysis showed clear peaks derived from 2p of Zn at 1020 and 1044 eV.

After 200 Å and 1000 Å etching with argon gas, the etched particles were again examined by XPS.

It was found that peak intensities were only one-second and one-fourth times the original peaks. The metal ester bonds are thus distributed in higher concentration in the surface area rather than the inside of the particle body.

DISINTEGRATION TEST AND TEST RESULTS

Each 1 g of the acrylic resin particles obtained in the respective Example (Examples 1 to 17 and Comparative Example 1) were placed in a series of 500 ml Erlenmeyer flasks, to which each 150 ml of the following respective medium:

(1) tetrahydrofuran
(2) deionized water
(3) aqueous weak alkali solution (KOH solution, pH 10.3)

were added and the content was stirred at 25° C. for 120 hours.

The disintegration properties were evaluated by checking the suspension conditions and determining the metal concentration of the filtrate by using an atomic absorption method. The test results are shown in Table 1.

TABLE 1

| | | Disintegration Test Results | | |
|---|---|---|---|---|
| | particles | THF (ppm) | deionized water (ppm) | aq. alkali solution (ppm) |
| Example | | | | |
| 1 | P-1 | clear (<0.1) | clear (<0.1) | milk-white (3.2) |
| 2 | P-2 | clear (<0.1) | clear (<0.1) | milk-white (3.6) |
| 3 | P-3 | clear (<0.1) | clear (<0.1) | milk-white (4.6) |
| 4 | P-4 | clear (<0.1) | clear (<0.1) | milk-white (3.8) |
| 5 | P-5 | clear (<0.1) | clear (<0.1) | milk-white (5.8) |
| 6 | P-6 | clear (<0.1) | clear (<0.1) | milk-white (2.7) |
| 7 | P-7 | clear (<0.1) | clear (<0.1) | milk-white (2.7) |
| 8 | P-8 | clear (<0.1) | clear (<0.1) | milk-white (5.1) |
| 9 | P-9 | clear (<0.1) | clear (<0.1) | milk-white (0.8) |
| 10 | P-10 | clear (<0.1) | clear (<0.1) | milk-white (3.8) |
| 11 | P-11 | clear (<0.1) | clear (<0.1) | milk-white (3.1) |
| 12 | P-12 | clear (<0.1) | clear (<0.1) | milk-white (1.6) |
| 13 | P-13 | clear (<0.1) | clear (<0.1) | milk-white (3.3) |
| 14 | P-14 | clear (<0.1) | clear (<0.1) | milk-white (3.6) |
| 15 | P-15 | clear (<0.1) | clear (<0.1) | milk-white (4.1) |
| 16 | P-16 | clear (<0.1) | clear (<0.1) | milk-white (2.4) |
| 17 | P-17 | clear (<0.1) | clear (<0.1) | milk-white (6.8) |
| Comp. Ex. | | | | |
| 1 | A | clear (<0.1) | clear (<0.1) | clear (<0.1) |

From the foregoing, it is clear that no disintegration can be seen, in either case of the resin particles (P-1) to (P-17), as well as Comparative resin particles (A), in such polar solvents as THF and deionized water. However, in an aqueous weak alkali solution, (P-1) to (P-17) particles having metal ester bondings at crosslinking moieties are disintegrated by hydrolysis, whereas the Comparative resinous particles (A) having no such bondings can never be disintegrated.

Metal Ions Solve Out Speed Test

Each 1 gram of the resin particles (P-1), (P-5) and Comparative particles B were placed in a series of 500 ml Erlenmeyer flasks, to which each 150 ml of aqueous KOH solution (pH 10.3) were added and the content was stirred at room temperature.

The amounts of metal ions solved out of the respective particles were determined time by time.

The test results are shown in FIG. 1.

What is claimed is:

1. Disintegration crosslinked acrylic resin particles having an average grain diameter of 0.01 to 250 μ and containing metal ester bond bearing crosslinks uniformly distributed within the particle bodies, but wherein the crosslinked density is higher in the center than the surface layer of the particles, said particles prepared by the method wherein a monomer mixture of (A) 5 to 98% by weight of at least one metal ester bond bearing multifunctional polymerizable monomer represented by the formula:

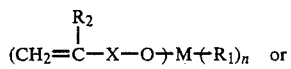

or

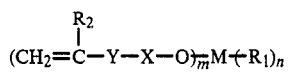

in which $R_2$ is hydrogen or a methyl group; X is a radical selected from the group consisting of

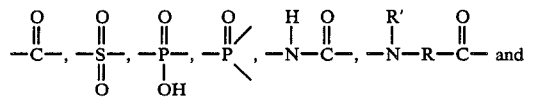

and

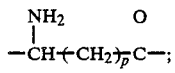

$R'$ is a hydrogen, methyl or ethyl group; R is a hydrocarbon residue having 1 to 20 carbon atoms; p is 0 or 1 to 5; $R_1$ is a hydrocarbon residue having 1 to 10 carbon atoms; M stands for metal whose valency is 2 or more; Y is an organic residue; m and n are positive integers fulfilling the requirements of $2 \leq m \leq 1$ q and $n = q - m$ in which q is equal to the metal valency, and (B) 95 to 2% by weight of at least one polymerizable monomer other than said (A) having at least one, $\beta$-ethylenically unsaturated bond, is polymerized in a reaction medium which cannot dissolve the formed polymer and the thus-formed polymer particles are separated from the said medium.

2. The acrylic resin particles according to claim 1, wherein the resin particles are spherical form of internally crosslinked acrylic resin particles.

3. The acrylic resin particles according to claim 1, wherein crosslink density of said metal ester bond bearing crosslinks is, expressed in terms of number of moles of organic acid involved in the metal ester bond bearing crosslinks/gram of resin particle, 0.00003 to 0.01 mol/g.

4. The acrylic resin particles according to claim 1, wherein the polymerization is effected by emulsion polymerization, suspension polymerization, precipitation polymerization or non-aqueous dispersion polymerization means.

5. The acrylic resin particles according to claim 1, wherein the metal is selected from the members belonging to the Groups Ib, IIa, IIb, IIIa, IIIb, IVa, IVb, Va, Vb, VIIa and VIII of the Periodic Table.

6. The acrylic resin particles according to claim 5, wherein the metal is selected from the group consisting of Cu, Zn, Ni, Co, Mn, Sn and Hg.

7. The acrylic resin particles according to claim 5, wherein the metal is selected from the group consisting of Ti, Ge, Ga, Al, Mg, Y, Sr, Zr, Bi, Ba, Ca and Fe.

8. The acrylic resin particles according to claim 1, wherein the reaction medium is a liquid which cannot dissolve, in substance the metal ester bond bearing multifunctional polymerizable monomer, as well as the formed polymer.

* * * * *